Patented July 10, 1951

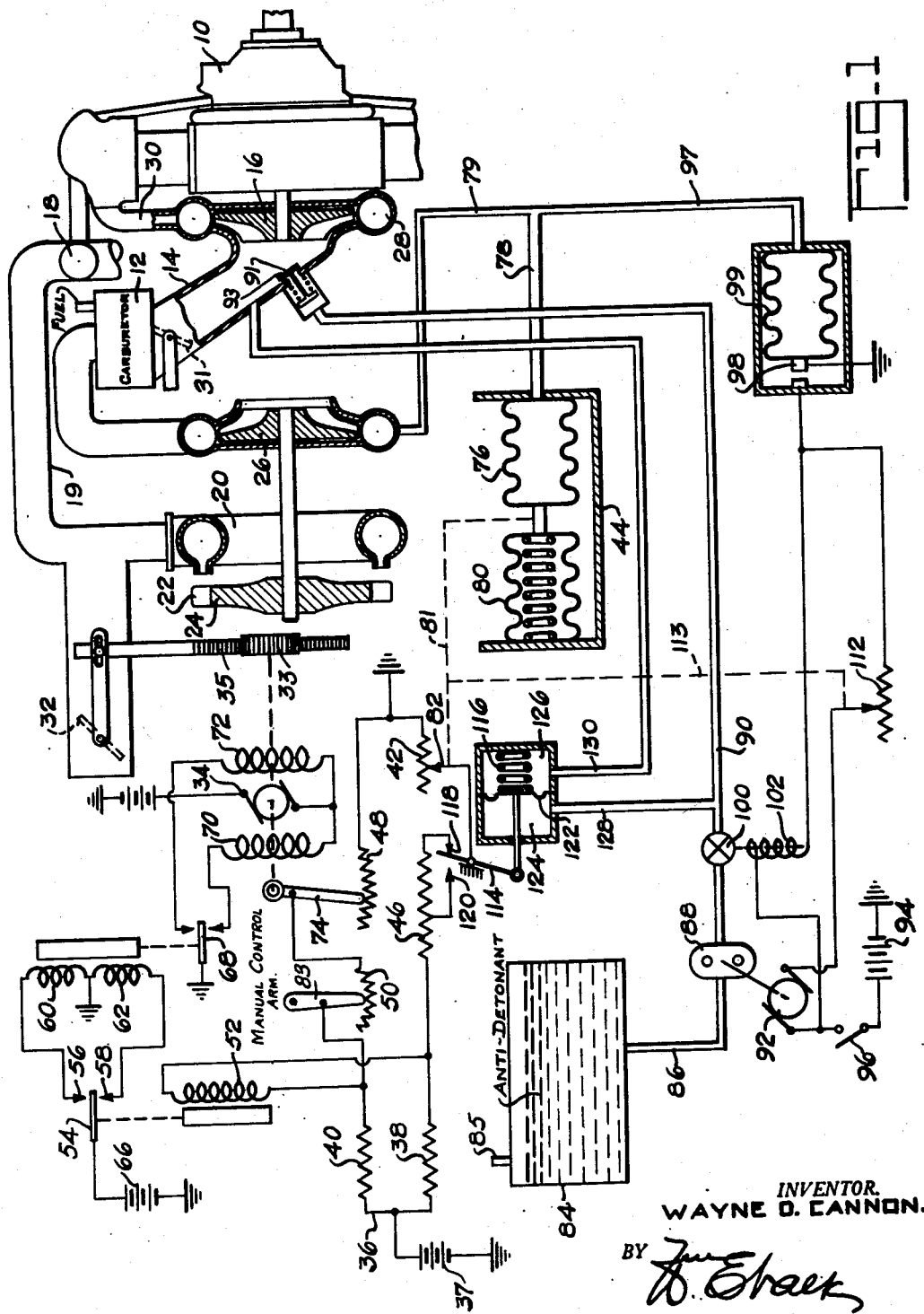

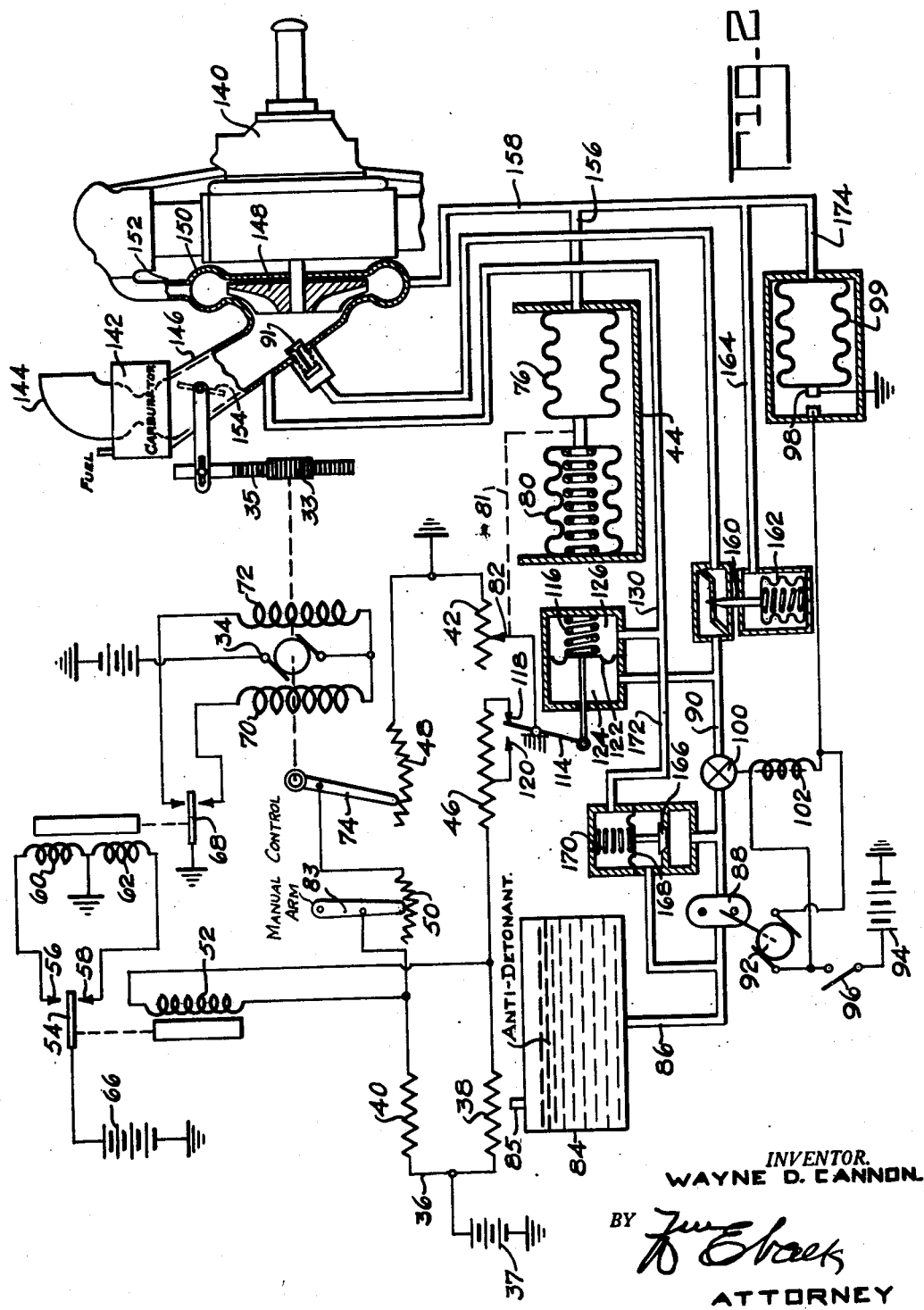

2,560,213

UNITED STATES PATENT OFFICE 2,560,213

ANTIDETONANT INJECTION SYSTEM

Wayne D. Cannon, Hohokus, N. J., assignor to Wright Aeronautical Corporation, a corporation of New York Application August 22, 1944, Serial No. 550,623

12 Claims. (Cl. 123—25)

This invention relates to means for inhibiting detonation in an internal combustion engine and is particularly directed to an anti-detonant fluid injection system for cooling an internal combustion engine and for permitting high power engine operation without detonation.

The amount of power available from an internal combustion engine is limited by the occurrence of detonation in the engine combustion chambers. It is also known that by the introduction of water, alcohol or other anti-knock fluids into the engine at high engine powers, the range of detonation-free engine power may be considerably increased. In order to regulate the power of an internal combustion engine, it is conventional practice to provide an electric bridge circuit for controlling the position of an engine power regulating member in response to variations in the power output of the engine. It is an object of this invention to provide means for injecting an anti-detonant into the engine when the engine power exceeds a predetermined value, and in response thereto, adjusting said electric bridge circuit to effect a further increase in the power of the engine. It is a further object of this invention to provide means operative in response to depletion of the supply of said anti-detonant during said high power engine operation for adjusting said bridge circuit to effect an automatic reduction in the power of said engine. In this way it is impossible to operate the engine above its normal detonation-free power range unless a supply of anti-detonant is available, and if a supply of anti-detonant is available, the engine may be operated without detonation at powers above this normal detonation-free power range in response to the supply of anti-detonant thereto. Also, if the supply of anti-detonant should fail during said above normal power operation, the engine power is automatically reduced, thereby avoiding damage to the engine.

Other objects of this invention will become apparent upon reading the annexed detailed description in connection with the drawing in which:

Figure 1 is a schematic view illustrating the invention applied to an internal combustion engine equipped with a turbo-supercharger in which the engine power is controlled by an electric bridge circuit adapted to regulate a turbo-supercharger; and Figure 2 is a schematic view similar to Figure 1 illustrating the invention applied to an internal combustion engine equipped with an engine driven supercharger in which the control therefor also comprises an electric bridge circuit.

Referring to Figure 1, a conventional aircraft engine 10 is provided with a carburetor 12 and a carburetor adapter 14 connected with the intake side of an engine driven supercharger 16. The exhaust from the engine is delivered to an exhaust manifold 18 and thence through conduit 19 to an annular nozzle box 20 from which it discharges against the buckets 22 of a turbine wheel 24. The turbine wheel 24 is drivably connected to the impeller of a supercharger 26 which supplies air compressed thereby to the carburetor 12. From the carburetor 12 the combustion air or fuel mixture is delivered through the carburetor adapter 14 to the engine driven supercharger 16. The supercharger 16 further compresses the combustion air or fuel mixture and discharges it into an annular intake manifold 28 from which the combustion air or fuel mixture is fed to the various engine cylinders through the intake pipes 30. A conventional manually operable throttle valve 31 is also provided below the carburetor 12.

A valve or so-called waste gate 32 disposed ahead of the nozzle box 20 controls the quantity of the engine exhaust gases delivered to the turbine by controlling the side of a by-pass opening in the pipe 19. Thus, the waste gate 32 controls the extent to which the combustion air is compressed which in turn controls the power output of the engine. The waste gate 32 is connected to an electric motor 34, whose direction and extent of operation is controlled by an electric Wheatstone bridge circuit 36 in response to the changes in the output pressure of the turbine-driven supercharger 26. The motor may be connected to the waste gate 32 by any suitable means e. g. by the pinion 33 and rack 35 illustrated in the drawing. The Wheatstone bridge circuit 36 is connected to a source of electric energy 37 in the usual manner, and comprises a pair of fixed resistances 38 and 40, respectively forming the first and second arms of the bridge. As is illustrated one side of the source of electric energy 37 is grounded and the other side is connected between the two arms 38 and 40. One of the other arms of the bridge comprises a resistance 42 adjustable by a device 44 responsive to the output pressure of the turbo-supercharger. Connected in series with the resistance 42 is an adjustable resistance 46, the purpose of which will be hereinafter described. The resistances 42 and 46 together form the third arm of the bridge. The remaining or the fourth arm of the bridge comprises a pair of serially connected adjustable resistances 48 and 50 and the Wheatstone bridge is provided with a ground connection between its third and fourth arms to complete the circuit to the bridge. A relay 52 has its one end connected to the junction of the first and third arms of the Wheatstone bridge and has its other end connected to the junction of the second and fourth arms of the bridge whereby the relay 52 is responsive to unbalancing of the bridge. A switch arm 54 is operated by the relay 52 to engage contact 56 or 58, depending on the direction or flow of current through the relay 52. The switch arm 54, upon engagement with contact 56 or 58, energizes one or the other of a pair of motor relay windings 60 and 62 from a source of electric energy 66, depending on the direction of operation of the arm 54. The motor relay 60, 62 controls a switch arm 68 which operates in one direction or the other to energize one or the other pair of windings 70 or 72 of an electric motor 34 for controlling the direction of operation of the waste gate 32, depending on which of the motor relay windings 60 or 62 is energized. The electric motor 34 is also drivably connected to an arm 74 for adjusting the bridge resistance 48 in a direction to rebalance the bridge in response to operation of the motor.

The pressure responsive device 44 comprises a bellows 76 responsive to the output pressure of the turbine-driven supercharger 26 through conduits 78 and 79 connected with the interior of the bellows 76. The expansion of the bellows 76 is resisted by a sealed evacuated bellows 80 of equal size and provided with a suitable compression spring therein, whereby the expansion of the pressure responsive bellows 76 is independent of the pressure of the surrounding atmosphere. A contact arm 82, for adjusting the bridge circuit resistance 42; is connected to the facing ends of bellows 76 and 80 for movement therewith by means schematically indicated at 81. The power output of the engine is a function of the output pressure of the turbine-driven supercharger 26, and therefore the bellows 76 expands and contracts with increase or decrease of the engine power. With the structure so far described, the turbo-supercharger output is operative to control the Wheatstone bridge circuit, and upon an increase in this pressure, the resistance 42 is increased to unbalance the bridge in a direction to effect operation of the electric motor 34 to open the waste gate and reduce the output of the turbine. At the same time the operation of the electric motor 34 moves the contact arm 74 to increase the resistance 48 to rebalance the bridge. A similar but reverse operation takes place upon a decrease in the output pressure of the turbo-supercharger. In this way, the Wheatstone bridge circuit operates to maintain a substantially constant turbo-supercharger output pressure. The resistance 50 is adjustable by manually operable contact arm 83 to determine the particular turbo-supercharger output pressure maintained by the Wheatstone bridge circuit by controlling the position of the waste gate 32. In this way the engine intake pressure in the manifold 28 and therefore the engine power is controlled both by the waste gate 32 and by the position of the throttle valve 31. The structure so far described is quite conventional, and it should be noted that although a Wheatstone bridge circuit has been illustrated, many other electric bridge circuits could obviously be substituted therefor. Also this invention is not limited to connection of the bellows 76 to the output of the supercharger 26, since obviously some other pressure of the engine exhaust or induction system, variable with the engine power, could be connected to the bellows 76 for controlling the waste gate 32.

A supply tank 84 having a vent 85 and containing water or other anti-detonant has a discharge conduit 86 connected to a pump 88 which is adapted to discharge the anti-detonant into the carburetor adapter 14 through the valve 100, conduit 90 and discharge nozzle 91. The nozzle valve 91 is spring biased toward closed position and may be provided with a small bleed opening 93 which offers considerable resistance to the flow of the liquid anti-detonant therethrough but which permits any gas pressure within conduit 90 to readily bleed therethrough when the supply of anti-detonant is exhausted. The pump 88 is drivably connected to an electric motor 92 which in turn is electrically connected in series with a source of electric energy 94, a manual switch 96, a resistance 112 and a switch 98 adapted to automatically close when the turbo-supercharger output pressure exceeds a predetermined value. The switch 98 is carried by a bellows 99 which is connected to the output of the turbo-supercharger through conduits 97 and 79. With this arrangement, the pump 88 is operated by the electric motor 92 whenever the output of the turbo-supercharger exceeds a predetermined value and manual switch 96 is closed, whereupon the anti-detonant is discharged into the engine induction system. A normally closed valve 100 is disposed in the conduit 90 to prevent leakage of anti-detonant through the pump into the engine induction system when the pump is idle. The valve 100 is operated by a solenoid 102 connected in series with the source of electric energy 94, manual switch 96, and pressure responsive switch 98, so that the valve 100 opens simultaneously with the operation of the pump.

If desired, the speed of the pump 88 may be controlled by an adjustable resistance 112 in the circuit of the pump motor. This resistance may be either manually adjusted or it may be adjusted by the pressure responsive bellows 76 as schematically indicated by the dash line 113 in Figure 1. With this latter arrangement, the quantity of anti-detonant delivered by the pump into the engine induction system is substantially proportional to the output of the turbo-supercharger or the engine power.

A pivotally mounted switch arm 114 is urged by a spring 116 into engagement with contact 118 to connect all of resistance 46 in series with the pressure responsive resistance 42. When anti-detonant is being discharged into the engine, the switch arm 114 is automatically operated into engagement with the contact 120 to cut out part or all of resistance 46 to unbalance the bridge circuit. To this end, the pivoted arm 114 is connected to a flexible diaphragm 122 and the spring 116, acting thereagainst, operates to urge the arm 114 into engagement with contact 118 to cut in all of resistance 46. The diaphragm 122 divides a housing therefor into a pair of chambers 124 and 126 respectively connected to the output pressure of the pump 88 and the pressure within the carburetor adapter by conduits 128 and 130. Accordingly, upon operation of the pump 88, the differential pressure on the diaphragm 122 is operative to pivot the switch arm 114 into engagement with contact 120 to cut out at least a portion of resistance 46. Reduction in the resistance 46 has the same unbalancing effect on the bridge as a reduction of serially connected resistance 42 in response to a falling off of the turbo-supercharger output pressure, and therefore results in a closing of the waste gate 32 to increase the engine power. With this arrangement, when the engine power is increased by manual adjustment of resistance 50 to the point where pressure responsive switch 98 closes, the pump 88 operates to discharge anti-detonant into the engine, whereupon the switch arm 114 disengages contact 118 and engages contact 120 to unbalance the bridge circuit such that the motor 34 adjusts the waste gate in a closing direction to effect an increase in the engine power. If during this high power engine operation, the supply of anti-detonant should become exhausted, then the output pressure of the pump 88 immediately falls off and the spring 116 returns the switch arm 114 into engagement with the contact 118 to again connect all of resistance 46 in series with the pressure responsive resistance 42, thereby unbalancing the bridge circuit in a direction such that the motor 34 immediately operates to open the waste gate 32 to reduce the engine power. At this point it should be noted that the resistance 50 is adjustable to vary the engine power output during high power engine operation with accompanying anti-detonant injection as well as during normal engine operation.

The operation of the system may be summarized as follows: The pressure responsive device 44 operates to unbalance the bridge circuit whenever the pressure deviates from a value determined by the position of manually adjustable resistance 50. Unbalancing of the bridge circuit effects operation of the motor 34 to adjust the waste gate 32 for correcting the turbo-supercharge output pressure, and at the same time the motor 34 adjusts contact arm 74 to rebalance the bridge. As the engine power is increased by adjustment of resistance 50 to the point where pressure responsive switch 98 closes, then assuming a supply of anti-detonant and that manual switch 96 is closed, the pump 88 operates to discharge anti-detonant into the engine to inhibit detonation thereof. Also, as a result of the discharge of anti-detonant into the engine, the electric bridge circuit is unbalanced by operation of switch arm 114, and the electric motor operates to close the waste gate for effecting a further increase in engine power, and at the same time, the electric motor 34 operates to rebalance the bridge. If the supply of anti-detonant should become exhausted, then the bridge is unbalanced by the return movement of switch arm 114 to effect operation of the electric motor 34 to open the waste gate, thereby automatically reducing the engine power, and at the same time the electric motor 34 rebalances the bridge. Manual switch 96 may be left open if at any time it is desired to operate the engine in the neighborhood of or above a normal engine detonation-free power range, without the use of anti-detonant, e. g., in order to conserve the supply of the anti-detonant for possible future needs in which it may be necessary to operate the engine at even higher powers.

Referring now to Figure 2, an internal combustion engine illustrated at 140 comprises a carburetor 142, carburetor air scoop 144, and carburetor adapter 146 connected to the intake of an engine driven supercharger 148. The engine driven supercharger 148 compresses the combustion air or fuel mixture and discharges it into an intake manifold 150 from whence it is discharged to the various engine cylinders by pipes 152. A conventional carburetor throttle valve 154 controls the air flow to the supercharger, thereby controlling the intake manifold pressure and the engine power.

The carburetor throttle 154 may be controlled by an electric bridge circuit similar to that illustrated in Figure 1, but in which the electric motor 34 is now operable through the gear 33 and rack 35 to adjust the carburetor throttle 154 instead of the waste gate 32, and the pressure responsive bellows 76 is now connected to the intake manifold pressure through lines 156 and 158 instead of to the output of a turbo-supercharger.

The anti-detonant injection portion of Figure 2 is also quite similar to Figure 1 except that the resistance 112 for controlling the speed of the motor 92 and thus the quantity of anti-detonant discharged into the engine in proportion to the engine power output has been replaced with a valve 160 adapted to meter the supply of anti-detonant in proportion to the engine power. Thus the valve 160 is controlled by a bellows 162 responsive to the engine manifold pressure through conduits 164 and 158. In addition, in order to insure a constant pressure differential across the metering valve 160, the pump 88 is provided with a pressure relief valve 166. This relief valve 166 is connected to a diaphragm 168 and is urged to a closed position by a spring 170. In addition the rear side of the diaphragm is connected to the carburetor adapter through conduits 172 and 130. With this arrangement the relief valve 166 is operative to open at a predetermined discharge pressure of pump 88 above the carburetor adapter pressure. In this way the relief valve 166 maintains a predetermined pressure differential between the inlet side of the metering valve 160 and the carburetor adapter. Also in Figure 2 the bellows 99 of the pressure responsive switch 98 is connected to the engine intake manifold pressure through lines 174 and 158 instead of to the output of the turbo-supercharger. The remaining structure of Figure 2 is similar to that of Figure 1 and has been designated by similar reference numerals.

The operation of the system of Figure 2 is therefore quite similar to Figure 1. Thus the pressure responsive device 44 operates to control the electric bridge circuit to adjust the carburetor throttle 154 in order to maintain a constant engine power corresponding to the manual adjustment of resistance 50. Upon an increase in the engine power above a predetermined value, the pressure responsive switch 98 closes, thereupon the pump 88 is operative to inject anti-detonant into the engine, and in response thereto, the bridge circuit is unbalanced to operate the electric motor 34 to open the throttle, thereby increasing the engine power. This operation of the electric motor 34 also serves to rebalance the bridge circuit. Also, as in Figure 1, if the supply of anti-detonant should become exhausted, the reduction in the pressure delivered by the pump 88 results in a return of switch arm 114 to its normal position to unbalance the bridge circuit, whereupon the electric motor 34 operates to effect a closing adjustment of the carburetor throttle 154 to reduce the engine power and at the same time, this operation of the electric motor rebalances the bridge circuit. In Figure 2 the valve 160 operates to meter the anti-detonant in proportion to the engine power while in Figure 1 the quantity of anti-detonant discharged into the engine is controlled in proportion to the engine power by varying the speed of the pump 88. Obviously these two arrangements for controlling the quantity of anti-detonant in proportion to the engine power are interchangeable.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications and changes.

I claim as my invention:

1. In an internal combustion engine, an engine power regulator, electrical means adjustable with variations in engine power for adjusting said regulator, means operative in response to an increase in the engine power above a predetermined value for effecting introduction of an anti-detonant into said engine, and means adapted to automatically adjust said electrical means to effect a further increase in the power of said engine substantially simultaneously with initiation of said anti-detonant introduction.

2. In an internal combustion engine, an engine power regulating member, means responsive to variations in engine power, an electric circuit controlled by said means for adjusting said power regulating member, means operative in response to an increase in engine power above a predetermined value for introducing an anti-detonant into said engine and for adjusting said electric circuit to cause a further increase in the power of said engine, said last named means including means operative upon stoppage of said anti-detonant introduction for adjusting said electric circuit for reducing the engine power.

3. In an internal combustion engine, an engine power regulating member, means variable with engine power, an electric circuit controlled by said means for adjusting said power regulating member, means operative in response to an increase in the engine power above a predetermined value for effecting injection of an anti-detonant into said engine, and means operative substantially simultaneously with initiation of said anti-detonant injection for adjusting said electric circuit in a manner to cause adjustment of said member to further increase the engine power.

4. In an internal combustion engine, an engine power regulating member, an electric bridge circuit, means responsive to variations in power of said engine for changing the balance condition of said bridge circuit, means operative in response to changes in the balance condition of said bridge circuit for adjusting said power regulating member to maintain a substantially constant engine power, means adjustable to determine the engine power maintained, means operative in response to an increase in engine power above a predetermined value for introducing an anti-detonant into said engine and for changing the balance condition of said bridge circuit to effect a further increase in the power of said engine.

5. In an internal combustion engine, an engine power regulating member, an electric bridge circuit, means responsive to variations in power of said engine for unbalancing said bridge circuit, means operable to rebalance said bridge circuit, means operative in response to unbalance of said bridge circuit for operating said bridge rebalancing means and for adjusting said power regulating member to maintain a substantially constant engine power, means adjustable to determine the engine power maintained, means operative in response to an increase in engine power above a predetermined value for introducing an anti-detonant into said engine, and means operative substantially simultaneously with said anti-detonant introduction for unbalancing said bridge circuit to effect a further increase in the power of said engine.

6. In an internal combustion engine, an engine power regulating member, an electric bridge circuit, means responsive to variations in power of said engine for unbalancing said bridge circuit, means operable to rebalance said bridge circuit, means operative in response to unbalance of said bridge circuit for operating said bridge rebalancing means and for adjusting said power regulating member to maintain a substantially constant engine power, means adjustable to determine the engine power maintained, means operative in response to an increase in engine power above a predetermined value for introducing an anti-detonant into said engine, and means operative substantially simultaneously with said anti-detonant introduction for unbalancing said bridge circuit to effect a further increase in the power of said engine, said last named means being operative upon stoppage of anti-detonant introduction to unbalance said bridge circuit to effect a reduction in the power of said engine.

7. In an internal combustion engine, an engine power regulator, electrical means adjustable with variations in engine power for adjusting said regulator, means operative in response to an increase in the engine power above a predetermined value for effecting introduction of an anti-detonant into said engine, and means adapted to automatically adjust said electrical means to effect a further increase in the power of said engine substantially simultaneously with initiation of said anti-detonant introduction, said last-named means including means adapted upon stoppage of said anti-detonant introduction to automatically adjust said electrical means to effect a reduction in the engine power.

8. In an internal combustion engine, an engine power regulator, electrical means adjustable with variations in engine power for adjusting said regulator, means operative in response to an increase in engine power above a predetermined value for effecting introduction of an anti-detonant into said engine, and means adapted upon stoppage of said anti-detonant introduction for automatically adjusting said electrical means to effect a reduction in the engine power.

9. In an apparatus for controlling the air pressure in the induction system of an internal combustion engine having a variable output compressor for supplying the air thereto and an electrical control system for said compressor, the said engine also being provided with a system for injection of a fluid anti-detonant, the said electrical control system including a manually adjustable selector for selecting various air pressures, and means operative at a preselected range of adjustment of said selector and responsive to the absence of a flow of the anti-detonant to the engine for overriding the call of said selector for pressures of a value too high for safe operation when the supply of anti-detonant for the injection system fails.

10. In an internal combustion engine; a member movable to vary the engine power; means responsive to variations in engine power; an electric circuit adjustable by said power responsive means for controlling the position of said power varying member; means for introducing an anti-detonant into said engine for inhibiting engine detonation; and means operative upon failure of the anti-detonant supply during said introduction for automatically adjusting said electric circuit so as to effect movement of said power regulating member in a power decreasing direction.

11. In an internal combustion engine, an engine power regulating member, means responsive to variations in engine power, a balanceable electric circuit controlled by said means for adjusting said power regulating member, means including a switch connected to said circuit operable upon said switch moving from a first position to a second position to alter the balance of said electric circuit to cause an increase in the power of said engine when the engine power is above a predetermined value, actuating means for said switch, and means operative in response to an increase in engine power above a predetermined value for introducing an anti-detonant into said engine and for affecting said actuating means in such a manner that said switch operates from said first position to said second position to cause a further increase in the power of said engine, said last named means including said actuating means and switch means being operative upon stoppage of said anti-detonant introduction for adjusting the balance of said electric circuit in a direction to reduce the engine power.

12. Control apparatus for a combustion engine having a compressor for supplying compressed air to the engine and means for injecting anti-detonant under pressure into the engine when high powers from the engine are desired, comprising in combination, means for automatically controlling the compressing effect of the compressor, said means comprising a balanceable electrical network and means responsive to the compressed air on the engine intake for adjusting said network so that preselected pressures may be maintained, a manual pressure selector for said network movable through a predetermined range of adjustment, electrical means including an electric switch connected to said network for restricting the pressure selected to a certain maximum dry value in the absence of injection of an anti-detonant into the engine when said selector is advanced to a position to call for maximum pressure, means including said electric switch operative upon the presence of anti-detonant to unbalance said network in a pressure increasing direction with said selector in said advanced position.

WAYNE D. CANNON.

REFERENCES CITED

The following references are of record in the file of this patent:

UNITED STATES PATENTS

| Number | Name | Date |
|---|---|---|
| 1,304,803 | Royce | May 27, 1919 |
| 1,557,793 | Berger | Oct. 20, 1925 |
| 2,118,842 | Grebe | May 31, 1938 |
| 2,251,751 | Minter | Aug. 5, 1941 |
| 2,295,656 | Hersey | Sept. 15, 1942 |
| 2,392,565 | Anderson et al. | Jan. 8, 1946 |

FOREIGN PATENTS

| Number | Country | Date |
|---|---|---|
| 458,611 | Great Britain | Dec. 23, 1936 |